(12) United States Patent
Gels et al.

(10) Patent No.: US 8,873,695 B2
(45) Date of Patent: Oct. 28, 2014

(54) REACTOR PRESSURE VESSEL HEAD VENTS AND METHODS OF USING THE SAME

(75) Inventors: John L. Gels, Wilmington, NC (US); David J. Keck, Wilmington, NC (US); Gerald A. Deaver, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 967 days.

(21) Appl. No.: 12/985,620

(22) Filed: Jan. 6, 2011

(65) Prior Publication Data
US 2012/0177164 A1 Jul. 12, 2012

(51) Int. Cl.
*G01S 13/02* (2006.01)
*G01S 13/00* (2006.01)

(52) U.S. Cl.
USPC ........... 376/205; 376/203; 376/277; 376/287; 376/293; 376/294

(58) Field of Classification Search
CPC ...... G21C 13/02; G21C 13/022; G21C 15/02; G21C 15/12; G21C 2013/02
USPC ......... 376/203, 205, 206, 463, 207, 210, 219, 376/230, 277, 287, 292–294; 976/DIG. 166–DIG. 185
See application file for complete search history.

(56) References Cited

U.S. PATENT DOCUMENTS

| | | | | |
|---|---|---|---|---|
| 2,744,064 A | * | 5/1956 | Moore | 376/287 |
| 3,255,088 A | * | 6/1966 | Ammon et al. | 376/203 |
| 3,276,965 A | * | 10/1966 | Leyse | 376/210 |
| 3,711,371 A | * | 1/1973 | Cahill, Jr. | 376/294 |
| 4,123,325 A | * | 10/1978 | Ichiki et al. | 376/293 |
| 4,567,016 A | | 1/1986 | Tong | |
| 4,687,625 A | * | 8/1987 | Hasegawa et al. | 376/292 |
| 4,752,433 A | * | 6/1988 | Altman et al. | 376/230 |

(Continued)

FOREIGN PATENT DOCUMENTS

| | | |
|---|---|---|
| JP | S5052496 A | 5/1975 |
| JP | S56112699 U | 8/1981 |

(Continued)

OTHER PUBLICATIONS

Search Report issued in connection with EP Patent Application No. 11195291.7, Mar. 30, 2012.

(Continued)

*Primary Examiner* — Bernarr Gregory
(74) *Attorney, Agent, or Firm* — Harness, Dickey & Pierce, PLC

(57) ABSTRACT

Internal head vents are usable in nuclear reactors and include piping inside of the reactor pressure vessel with a vent in the reactor upper head. Piping extends downward from the upper head and passes outside of the reactor to permit the gas to escape or be forcibly vented outside of the reactor without external piping on the upper head. The piping may include upper and lowers section that removably mate where the upper head joins to the reactor pressure vessel. The removable mating may include a compressible bellows and corresponding funnel. The piping is fabricated of nuclear-reactor-safe materials, including carbon steel, stainless steel, and/or a Ni—Cr—Fe alloy. Methods install an internal head vent in a nuclear reactor by securing piping to an internal surface of an upper head of the nuclear reactor and/or securing piping to an internal surface of a reactor pressure vessel.

20 Claims, 4 Drawing Sheets

(56) References Cited

U.S. PATENT DOCUMENTS

| | | | |
|---|---|---|---|
| 4,822,558 A | 4/1989 | Merkovsky et al. | |
| 5,278,876 A | 1/1994 | Sawabe | |
| 6,678,345 B2 * | 1/2004 | Hartmann et al. | 376/294 |
| 2010/0290576 A1 | 11/2010 | Yamazaki et al. | |

FOREIGN PATENT DOCUMENTS

| | | |
|---|---|---|
| JP | S586490 A | 1/1983 |
| JP | H06300883 A | 10/1994 |
| JP | H1082888 A | 3/1998 |
| JP | 2010236878 A | 10/2010 |

OTHER PUBLICATIONS

Unofficial English translation of a JP Office Action dated Jan. 28, 2014, issued in connection with corresponding JP Patent Application No. 2011-287520.

* cited by examiner

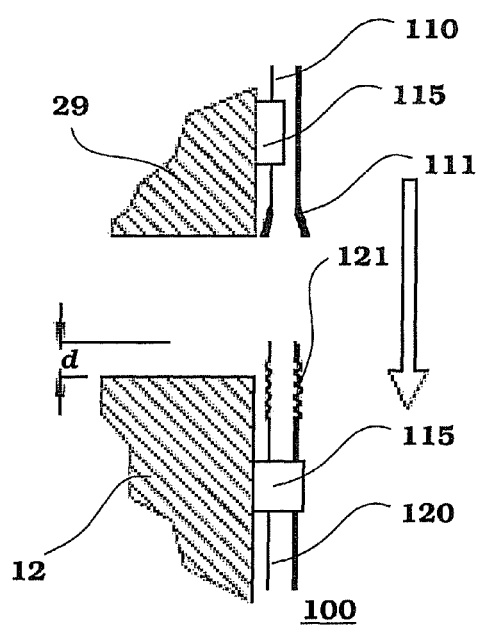 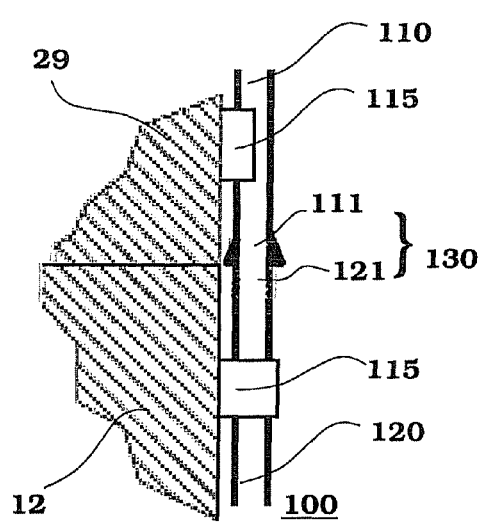
FIG. 4A
FIG. 4B

REACTOR PRESSURE VESSEL HEAD VENTS AND METHODS OF USING THE SAME

GOVERNMENT SUPPORT

This invention was made with Government support under contract number DE-FC07-07ID14778, awarded by the U.S. Department of Energy. The Government has certain rights in the invention.

BACKGROUND

As shown in FIG. 1, a conventional nuclear reactor, such as a Boiling Water Reactor (BWR), may include a reactor pressure vessel (RPV) 12 with a generally cylindrical shape. RPV 12 may be closed at a lower end by a bottom head 28 and at a top end by a removable upper head 29. A cylindrically-shaped core shroud 34 may surround reactor core 36, which includes several nuclear fuel elements that generate power through fission. Shroud 34 may be supported at one end by a shroud support 38 and may include a removable shroud head 39 and separator tube assembly at the other end. Fuel bundles may be aligned by a core plate 48 located at the base of core 36. One or more control blades 20 may extend upwards into core 36, so as to control the fission chain reaction within fuel elements of core 36. Additionally, one or more instrumentation tubes 50 may extend into reactor core 36 from outside RPV 12, such as through bottom head 28, permitting instrumentation, such as neutron monitors and thermocouples, to be inserted into and enclosed within the core 36 from an external position.

A fluid coolant, such as water, is circulated up through core 36 and core plate 48 and is at least partially converted to steam by the heat generated by fission in the fuel elements. The steam is separated and dried in separator tube assembly and steam dryer structures 15 and exits RPV 12 through a main steam nozzle 3 near top of RPV 12. The coolant circulated through and boiled in RPV 12 is typically pure and deionized, except for some additives that enhance coolant chemistry. During the course of operation, fission products may be inadvertently leaked into the coolant through failure of fuel elements in core 36, or hydrogen may be produced in fuel elements through radiolysis and other reactions. These and other events may cause non-condensable gasses to migrate up through coolant in RPV 12 and gather in upper head 29, where they decrease RPV volume and present explosion or other fluid-mechanical risks and problems.

Conventionally, a head vent 80 is provided in upper head 29 to prevent non-condensable gas accumulation in upper head 29 and also to provide a vent for air escape during RPV 12 filling in plant testing and outages. Head vent 80 includes a sealable passage through upper head 29 and external piping that routes gasses to a steam line 3 or sump area (not shown) outside of RPV 12.

SUMMARY

Example embodiments are directed to internal head vents for use in nuclear reactors. Example embodiments include piping inside of the reactor pressure vessel with a vent near the top inside surface of the reactor upper head, where gas may accumulate during hydrostatic testing or operation. The piping of example embodiments extends downward from the top of the upper head and passes outside of the reactor pressure vessel so as to permit the gas to escape or be forcibly vented outside of the reactor without external piping on the upper head. The piping may pass outside of the reactor through any penetration, including a steam outlet below the upper head. The piping may be joined to the upper head and/or reactor pressure vessel by any joining mechanisms or structures, including brackets attached to inner surfaces of the upper head and/or reactor pressure vessel. Such brackets may be of any number or type, so as to permit some relative movement in the piping at desired locations and/or rigidly fixing the piping and internal surfaces at desired locations.

The piping may include an upper and lower section that removably mate with each other at a connection point where the upper head joins to the reactor pressure vessel. Such removable mating may be accomplished with a compressible bellows and funnel to receive the piping section with the bellows. In an unjoined, uncompressed state, only the section with the bellows may extend above the top of the reactor pressure vessel flange to prevent extensions or projections from the upper head. Example embodiments may include a penetration nozzle that passes outside of the reactor pressure vessel through a penetration in the reactor pressure vessel or upper or lower head or any other penetration. The piping may be fabricated of nuclear-reactor-safe materials, including carbon steel, stainless steel, and/or a Ni—Cr—Fe alloy chosen in appropriate combinations to avoid material incompatibilities.

Example methods include installing an internal head vent in a nuclear reactor. Example methods include securing piping to an internal surface of an upper head of the nuclear reactor and/or securing piping to an internal surface of a reactor pressure vessel such that a vent in the piping is positioned near the top inside surface of the upper head and connects to or provides a passage for gas to flow through an end passing outside of the reactor pressure vessel.

BRIEF DESCRIPTION OF DRAWINGS

FIGS. 4A and 4B are detail illustrations of a connection point in the example embodiment internal head vent of FIG. 2.

DETAILED DESCRIPTION

Figure 1:
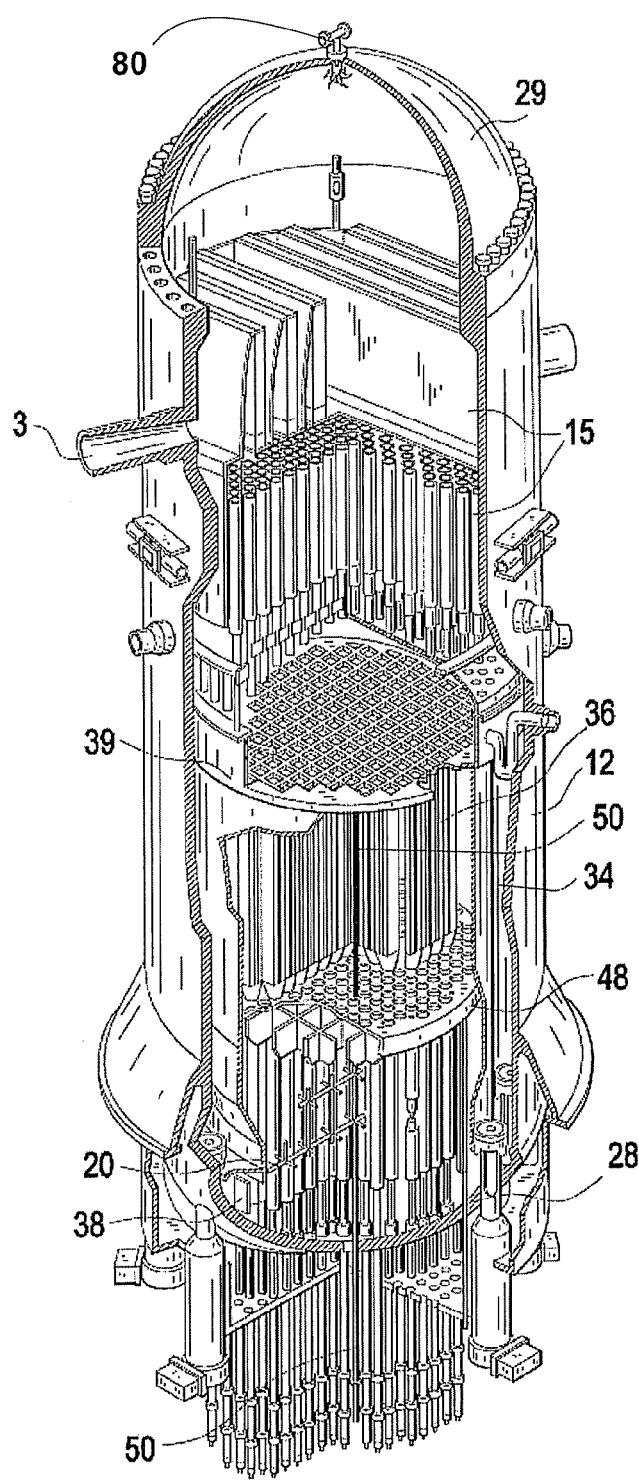
FIG. 1 is an illustration of a conventional Reactor Pressure Vessel and internals.

Hereinafter, example embodiments will be described in detail with reference to the attached drawings. However, specific structural and functional details disclosed herein are merely representative for purposes of describing example embodiments. For example, although example embodiments may be described with reference to a Boiling Water Reactor (BWR), it is understood that example embodiments may be useable in other types of nuclear plants and in other technological fields. The example embodiments may be embodied in many alternate forms and should not be construed as limited to only example embodiments set forth herein.

It will be understood that, although the terms first, second, etc. may be used herein to describe various elements, these elements should not be limited by these terms. These tee are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

As used herein, the singular forms "a," "an," and "the" are intended to include the plural forms as well, unless the language explicitly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures or described in the specification. For example, two figures or steps shown in succession may in fact be executed in parallel and concurrently or may sometimes be executed in the reverse order or repetitively, depending upon the functionality/acts involved.

The inventors of the present application have identified several problems with conventional head vent 80 (FIG. 1) devices and methods. For example, significant amounts of external piping are required to direct gasses from head vent 80 down to an acceptable exit or holding location, such as steam leg 3. Because upper head 29 is removed during a plant shutdown in order to access and provide maintenance to RPV 12 internals, all external piping associated with head vent 80 must be disassembled and stored prior to RPV 12 access. The amount of time and effort required to disassemble, store, and reassemble external piping may represent a loss of significant revenue to a commercial nuclear plant operator, because the plant does not generate electricity or revenue during such downtime. Example embodiments and methods discussed below uniquely address these effects of conventional head vent 80 usage to achieve several advantages, including reduced time and resource consumption during plant outages associated with removing, installing, and storing external piping for conventional head vent 80, and/or other advantages discussed below or not, in nuclear power plants.

Example Embodiments

Figure 2:
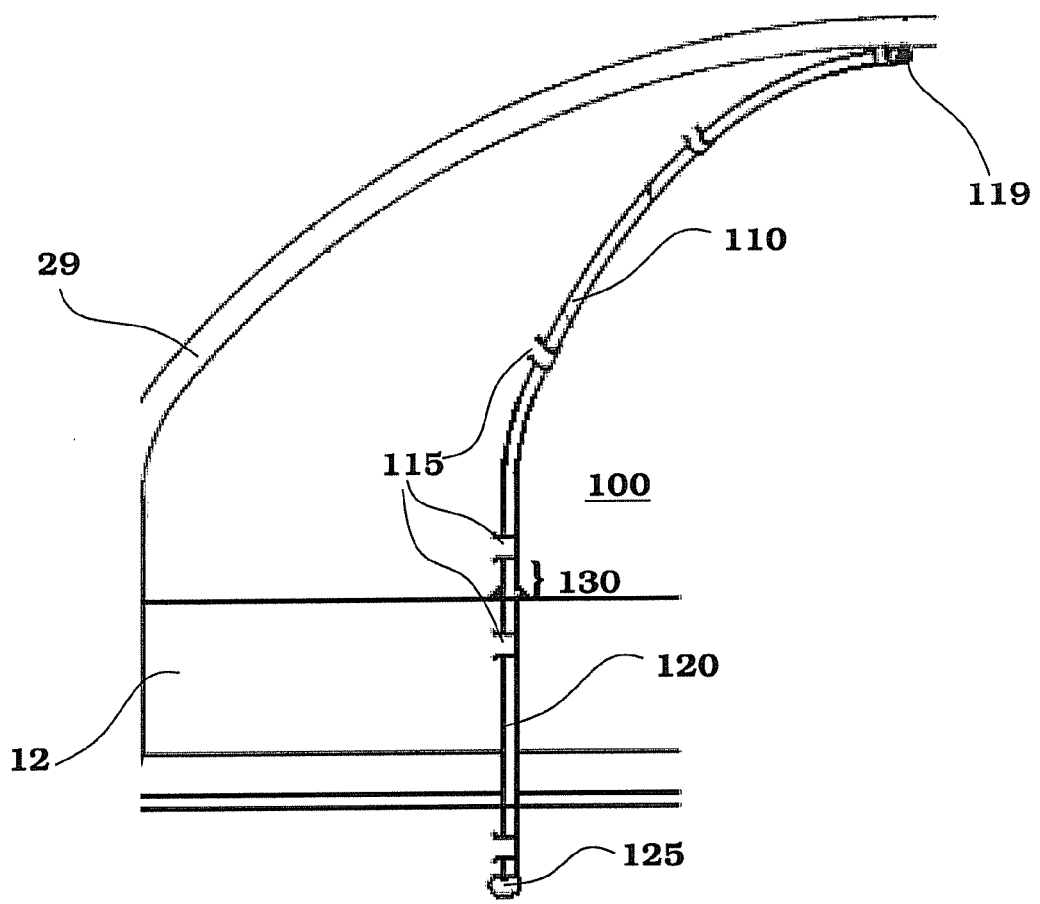
FIG. 2 is an illustration of an example embodiment internal head vent.

FIG. 2 is an illustration of an example embodiment internal head vent 100. As shown in FIG. 2, example embodiment internal head vent 100 includes internal piping that provides an exit for gasses in upper head 29 through a penetration in RPV 12, including upper head 29. Piping of example embodiment internal head vent 100 may include upper piping 110 and lower piping 120 inside of an RPV 12 and upper head 29. Example embodiment internal head vent 100 includes a vent hole 119 into which non-condensable gasses accumulated at the top of upper head 29 may pass for removal from RPV 12. Upper piping 110 may include such a vent hole 119 and join to lower piping 120 during operation, permitting non-condensable gasses to pass into lower piping, which then exit RPV through an existing penetration, such as steam outlet 3 (FIG. 1). In this way, non-condensable gasses accumulated at the top of upper head 29 may exit RPV 12 through internal piping, and conventional head vent 80 with its associated piping may not be used.

Upper piping 110 and lower piping 120 may be held in place in any number of ways in example embodiment internal head vent 100. For example, upper piping 110 and lower piping 120 may be joined to an inner surface of upper head 29 and RPV 12, respectively, as shown in FIG. 2. Upper piping 110 and lower piping 120 may be closely positioned to inner surfaces of upper head 29 and RPV 12 in order to create minimal obstruction and achieve a slim profile in example embodiment internal head vent 100, thereby reducing risks of impact or flow obstruction. Upper piping 110 and lower piping 120 may be joined to upper head 29 and RPV 12 in several ways, including welding, mechanical fasteners, adhesives, brackets, integrally formed passages in upper head 29 and RPV 12, etc.

For example, as shown in FIG. 2, several brackets 115 may join between RPV 12 and/or upper head 29 and upper piping 110 and lower piping 120 to secure each piping portion. Any number and type of brackets 115 may secure piping portions to upper head 29 and/or RPV 12. Brackets may be joined to upper head 29 and/or RPV 12 by any acceptable methods including welding, integral forming, rivets, adhesives, etc. As shown in the example of FIG. 2, six brackets 115 are used at varying vertical intervals along a length of upper piping 110 and lower piping 120. Brackets 115 are illustrated as having varying configurations in example embodiments, and it is understood that any bracket design or type may be used consistently or varied in example embodiments. As shown in the figures by way of example, the top three brackets 115 joining upper piping 110 to upper head 29 may be horseshoe-type brackets into which upper piping 110 seats and is joined thereto by a band passed around a front of upper piping 110 and welded to bracket 115, permitting some piping movement along a length of upper piping 110. Lowest of the brackets 115 joining upper piping 110 to upper head 29 and lower piping 120 to RPV 12 may be horseshoe-type brackets into which upper piping 110 and lower piping 120 are seated and directly welded, preventing most relative movement between these brackets 115 and piping. Upper bracket 115 joining lower piping 120 and RPV 12 may be a through-hole-type bracket that permits relative vertical movement or compression in lower piping 120. Of course, any different numbers/types/arrangements of brackets 115 in example embodiment internal head vent 100 are acceptable.

Upper piping 110 and lower piping 120 may be any size or sizes that permit acceptable gas flow therethrough while maintaining a small profile against internal surfaces of upper head 29 and RPV 12 and fitting into a penetration, such as steam leg 3, for exhausting the gas. For example, upper piping 110 and lower piping 120 may be 2-inch pipes that permit adequate non-condensable gas flow without obstruction or significant profile extension. Brackets 115 may be correspondingly sized depending on a size or sizes chosen for upper piping 110 and lower piping 120.

Figure 3:
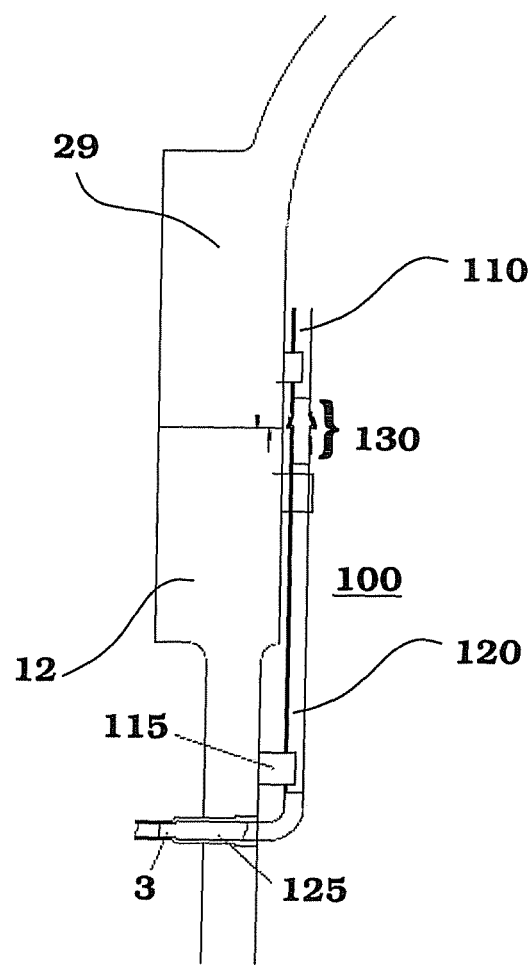
FIG. 3 is a schematic profile view of the example embodiment internal head vent of FIG. 2.

As shown in FIG. 3, example embodiment internal head vent 100 may pass through RPV 12 via one or more penetrations, existing or newly created in RPV 12. For example, penetration nozzle 125 may be a nozzle connecting to a steam line 3 and attached via a bend to lower piping 120. Alternately, penetration nozzle 125 may be at another position and connect to a sump or other gas exhausting feature in the nuclear plant. Example embodiment internal head vent 100 may be positioned within RPV 12 for ready access to penetrations. Similarly, example embodiment internal head vent 100 may be positioned such that lower piping 120 and penetration nozzle 125, and brackets 115 associated therewith, pass between and do not otherwise interfere with other reactor internals, including steam dryer structures 15 (FIG. 1) that may be conventionally placed in an upper portion of RPV 12.

As shown in FIGS. 2, 3, and 4A, and 4B upper piping 110 may join to lower piping 120 at a connection point 130 located approximate to where upper head 29 joins RPV 12. In this way, example embodiment internal head vent 100 may inherently disassemble with the removal of upper head 29 from RPV 12 during plant maintenance, without additional pipe work and/or storage. Further, by providing a slim profile against inner surfaces of upper head 29 and/or RPV 12 and nearly evenly separating at connection point 130 where upper head 29 and RPV 12 separate, risks of impacts and interference caused by example embodiment internal head vent 100 may be minimized.

Upper piping 110 and lower piping 120 in example embodiment internal head vent 100 may removably join at connection point 130 by any number of known connection mechanisms, including mechanical fasteners, lock-and-key arrangements, adhesives, magnets, frictional abutting, etc. For example, as shown in FIGS. 4A and 4B, upper piping 110 may join to lower piping 120 at connection point 130 via a funnel 111 and compressible bellows 121 that reciprocally mate and seal.

As shown in FIG. 4A, compressible bellows 121 may be a part of lower piping 120 near a terminal of the same. Lower piping 120 may extend above an upper flange of RPV 12 by a distance d when upper head 29 is separated from RPV 12 as shown in FIG. 4A. Distance d may be relatively small to reduce any risk of catching or interference caused by lower piping 120 extending the distance d. Because lower piping 120 with compressible bellows 121 extends upwards a distance d, upper piping 110 and funnel 111 may be flush or recessed with a lower flange of upper head 29. In this way, upper head 29 may be removed and relocated during an outage without concern for protruding pieces that would complicate moving and storing upper head 29. Similarly, because RPV 12 is stationary, the protrusion of lower piping 120 upwards the distance d from an upper flange of RPV 12 may have minimal handling and moving consequences.

Compressible bellows 121 may include one or more annular corrugations that provide desired flexibility and compressibility to bellows 121 at an end of lower piping 120. Bellows 121 may be compressible a substantial portion of protruding distance d, such that connection point 130 may be substantially equal with a contact position of upper head 29 and RPV 12 when joined. A proper number of annular corrugations and chosen material (discussed below) for compressible bellows 121 may permit repetitive, non-destructive compression and separation of bellows 121 and funnel 111.

An outer diameter of a terminus of lower piping 120 at bellows 121 may be smaller than a maximum diameter of corresponding funnel 111 of upper piping 110, such that bellows 121 may seat into funnel 111 upon contact. As shown in FIG. 4B, when upper head 29 and RPV 12 are joined, funnel 111 may seat over bellows 121 which compresses and seals/joins upper piping 110 and lower piping 120 together. The outer diameter of bellows 121 may be rounded or otherwise appropriately shaped to ensure an even and tight fit in connection point 130. Knowing and/or setting the distance that bellows 121 will be compressed when upper head 29 and RPV 12 are joined and a spring constant of bellows 121, one may attain a desired level of compressive pressure between funnel 111 and bellows 121. For example, if bellows 121 compresses 65 mm and bellows 121 has a spring constant of 35 N/mm, connection point 130 fully seated in FIG. 4B will have a compressive force of 2.275 kN between bellows 121 and funnel 111, which may adequately seal upper piping 110 and lower piping 120.

Although connection point 130 is shown as a removable abutting-type mating between bellows 121 and funnel 111 in lower piping 120 and upper piping 110, respectively, it is understood that bellows 121 and funnel 111 may reverse positions. Similarly, it is understood that additional sealants, lubricants, and joining mechanisms may be used in addition to funnel 111 and bellows 121. Further, it is understood that entirely different connection mechanisms and structures at connection point 130 may be used in example embodiment internal head vents.

Example embodiment internal head vents may be fabricated from materials designed to withstand operating conditions within a nuclear reactor and provide material compatibility and avoid fouling for contacting pieces. For example, upper piping 110 and lower piping 120 may be fabricated of carbon steel, bellows 121 may be fabricated of stainless steel, and funnel 111 and penetration nozzle 125 may be fabricated of a compatible Ni—Cr—Fe alloy to avoid fouling and provide additional material strength for these components, while also permitting non-destructive thermal expansion among the various components. Or, for example, any of upper piping 110, brackets 115, lower piping 120, bellows 121, funnel 111 and/or penetration nozzle 125 may be fabricated from zircaloys, austenitic stainless steel, nickel alloys, etc. that substantially maintain their physical properties in high pressure/temperature aqueous environments with elevated levels and types of radioactivity.

Example embodiment internal head vents are thus useable in several harsh environments such as operating nuclear power reactors. It is understood that several features discussed above in connection with example embodiments may be reconfigured or omitted based on the specific application and/or desired operational characteristics of example embodiment internal head vents. While example embodiment internal head vents 100 may be installed and used in accordance with example methods discussed below, it is understood that other uses and installation locations may be applicable with example embodiment internal head vents.

Example Methods

Example methods include installing internal head vents, such as example embodiment internal head vent 100, in a nuclear reactor. Example methods include determining a location for installation of the internal head vent within a nuclear power plant. Any location may be chosen that permits vent opening 119 to be at a nearly highest vertical point in upper head 29 so that non-condensable gasses will flow into opening 119 in the operating reactor. For example, vent opening 119 may be within ten centimeters of a topmost internal surface of upper head 29 where buoyant gasses may accumulate in a liquid-filled vessel, or vent opening may be elsewhere near a top inner surface of upper head 29 to set a total volume of gas permitted within the vessel as the volume of the space between vent opening 119 and upper head 29. The location may also not interfere with other operating reactor internals such as drying apparatuses 115. For example, as shown in FIG. 2, a position about a circumferential surface of a RPV 12 and upper head 29, about a steam outlet 3, may be a position of interest due to its proximity to an existing penetration. Other positions within the nuclear plant and/or nuclear reactor may be chosen based on similar interests in avoiding interferences and providing non-condensable access to an internal outlet.

The internal head vent may be installed in the desired position so as to receive and exhaust non-condensable gasses or provide gas outlets during vessel filling from the chosen position. The installation may occur during plant fabrication, during an outage, or during any other periods when the location is accessible. The internal head vent may be installed through several known methods of securely positioning components within a nuclear reactor. For example, internal head vent 100 may be welded and fastened to brackets 115 along an inner surface of RPV 12 and upper head 29 as shown in FIGS. 2, 3, 4A, and 4B. Penetration nozzle 125 may be connected to or provided at a desired outlet, including steam outlet 3, for example. Several alternate methods of installing and securing an internal head vent at the desired position are possible, including use of fasteners, screws, tang/receptor matings, or mechanisms involving tying, friction, or adhesives.

Once installed at the desired position, upper head 29 may be joined and sealed to RPV 12 to achieve the configuration shown in FIG. 1 (external) and FIG. 4B (internal). Upper piping 110 may inherently seal and join with lower piping 120 during the installation of upper head 29 through structuring discussed above in connection with example embodiments. Power operations or other events within the nuclear reactor may be commenced that cause gas to pass through internal head vent 100 and out of RPV 12.

Example embodiments and methods thus being described, it will be appreciated by one skilled in the art that example embodiments may be varied through routine experimentation and without further inventive activity. Variations are not to be regarded as departure from the spirit and scope of the example embodiments, and all such modifications as would be obvious to one skilled in the art are intended to be included within the scope of the following claims.

What is claimed is:

1. A nuclear reactor internal head vent, comprising:
    a reactor pressure vessel with a main body and a removable upper head, the removable upper head being configured to seal a top end of the main body of the reactor pressure vessel; and
    a piping internal to the reactor pressure vessel, the piping including an opening near a top of an inner surface of the upper head, the piping extending downward from the upper head and into the main body of the reactor pressure vessel, the piping passing outside the main body of the reactor pressure vessel at a location that is below the opening.

2. The nuclear reactor internal head vent of claim 1, further comprising:
    a steam outlet connected to the main body of the reactor pressure vessel below the upper head, the piping passing outside of the reactor pressure vessel where the steam outlet connects to the main body of the reactor pressure vessel.

3. The nuclear reactor internal head vent of claim 1, further comprising:
    a plurality of brackets joining the piping to an internal surface of the upper head and the main body of the reactor pressure vessel.

4. The nuclear reactor internal head vent of claim 3, wherein a bracket at a lowest point of the internal surface of the upper head and a lowest point of the internal surface of the main body of the reactor pressure vessel are welded to the piping so as to prevent relative movement between the piping and bracket.

5. The nuclear reactor internal head vent of claim 1, wherein the piping includes an upper piping and a lower piping, the upper and the lower piping configured to removably mate with each other at a connection point.

6. The nuclear reactor internal head vent of claim 5, wherein the connection point is a point where the upper head joins to the main body of the reactor pressure vessel.

7. The nuclear reactor internal head vent of claim 5, wherein the lower piping includes a compressible bellows and wherein the upper piping includes a funnel at a terminal of the upper piping, the funnel being shaped to receive a terminal of the lower piping.

8. The nuclear reactor internal head vent of claim 7, wherein the lower piping terminates at or above a bottom of the upper head, wherein the lower piping extends above a top of the main body of the reactor pressure vessel when removed from the upper piping, and wherein the compressible bellows is configured to shorten the lower piping when mated with the upper piping such that the connection point is a point where the upper head joins to the main body of the reactor pressure vessel.

9. The nuclear reactor internal head vent of claim 7, wherein the piping further includes a penetration nozzle passing outside of the main body of the reactor pressure vessel.

10. The nuclear reactor internal head vent of claim 9, wherein the upper piping and the lower piping are fabricated of carbon steel, wherein the compressible bellows is fabricated of stainless steel, and wherein the funnel and the penetration nozzle are fabricated of a Ni—Cr—Fe alloy.

11. The nuclear reactor internal head vent of claim 1, wherein the upper head includes no external piping venting gas from the upper head.

12. An internal head vent for use in a nuclear reactor, the internal head vent comprising:
    an upper piping configured to be joined to and shaped to extend along an internal surface of an upper head of the nuclear reactor, the upper piping including a vent and shaped such that the vent is positioned at a top inside position of the upper head; and
    a lower piping configured to be joined to and shaped to extend along an internal surface of a reactor pressure vessel of the nuclear reactor, the lower piping configured to removably mate with the upper piping at a connection point when the upper head and the reactor pressure vessel are joined.

13. The internal head vent of claim 12, wherein the connection point is a point where the upper head joins to the reactor pressure vessel.

14. The internal head vent of claim 13, wherein the lower piping includes a compressible bellows and wherein the upper piping includes a funnel at a terminal of the upper piping, the funnel being shaped to receive an end of the lower piping.

15. The internal head vent of claim 14, wherein the compressible bellows is configured to seat against the funnel with a pressure sufficient to seal a flow path between the mated lower piping and upper piping.

16. The internal head vent of claim 14, wherein the lower piping further includes a penetration nozzle configured to pass outside of the reactor pressure vessel.

17. The internal head vent of claim 16, wherein the compressible bellows is fabricated of stainless steel, wherein the funnel and the penetration nozzle are fabricated of a Ni—Cr—Fe alloy, and wherein the remaining portions of the upper piping and the lower piping are fabricated of carbon steel.

18. The internal head vent of claim 12, wherein the upper and lower piping are configured to vent gas accumulated in the upper head outside of the reactor pressure vessel without any of the internal head vent being on an external surface of the upper head.

19. A method of installing an internal head vent in a nuclear reactor, the method comprising:
    securing an upper piping to an internal surface of an upper head of the nuclear reactor, the upper piping including a vent and a discharging end, the securing including,
        positioning the vent to be near a top the internal surface of the upper head;

positioning the discharging end of the upper piping to be near a bottom of the upper head opposite the top.

20. The method of claim 19, further comprising:

securing a lower piping to an internal surface of a reactor pressure vessel of the nuclear reactor at a position corresponding to the upper piping; and passing an end of the lower piping outside of the reactor pressure vessel.

\* \* \* \* \*